United States Patent [19]

Dunwoodie

[11] Patent Number: 4,833,771

[45] Date of Patent: May 30, 1989

[54] AIR CARGO CONTAINER AND METHOD FOR FORMING SIDE PANELS THEREOF

[75] Inventor: Edward H. Dunwoodie, Long Beach, Calif.

[73] Assignee: Century Aero Products International, Inc., Compton, Calif.

[21] Appl. No.: 108,198

[22] Filed: Oct. 13, 1987

[51] Int. Cl.[4] .................. B23P 19/00; B65D 88/00
[52] U.S. Cl. .................... 220/1.5; 29/525.1; 264/322
[58] Field of Search ............ 29/526 R; 264/322; 220/1.5

[56] References Cited

U.S. PATENT DOCUMENTS

| | | | |
|---|---|---|---|
| 2,283,574 | 5/1942 | Pillsbury | 189/84 |
| 2,838,592 | 6/1958 | Feketics | 174/35 |
| 3,424,331 | 1/1969 | Borden | 220/1.5 |
| 3,589,548 | 6/1971 | Weiss | 220/4 R |
| 3,598,273 | 8/1971 | Rau et al. | 220/1.5 |
| 3,907,148 | 9/1975 | Meller et al. | 220/1.5 |
| 4,046,186 | 9/1977 | Nordstrom | 160/368 R |
| 4,212,406 | 7/1980 | Mittelmann | 220/1.5 |
| 4,429,730 | 2/1984 | Elston | 160/368 R |
| 4,563,320 | 1/1986 | Morgan | 364/322 |
| 4,756,863 | 7/1988 | Petershofer | 264/322 |

*Primary Examiner*—John K. Corbin
*Assistant Examiner*—J. Ryan
*Attorney, Agent, or Firm*—Herzig & Yanny

[57] ABSTRACT

This invention discloses a cargo container with transparent polycarbonate panels held by inner and outer corner molding strips. The molding strips are press-fitted together, form the corner joints of the container, and retain the panel edge corrugations by internesting the corrugations in a matching channel formed by the mated strips. The panel, therefore, is not penetrated by bolts, rivets, etc. The invention also discloses a method to progressively shape-form corrugations into preheated (to 120° F.) panels by a series of roller dies, some of which are also heated to 110° F.

17 Claims, 3 Drawing Sheets

AIR CARGO CONTAINER AND METHOD FOR FORMING SIDE PANELS THEREOF

BACKGROUND OF THE INVENTION

1. Field of the Invention.

This application relates to an improved air cargo container and enabling method and means for the construction thereof Also it pertains to an air cargo container corner construction which facilitates advantage in formation for assembly and disassembly of highly desired transparent and tough polycarbonate panels, in that it allows them for the first time to be used effectively in air cargo containers.

2. Brief Description of the Prior Art.

Prior art containers and container structures have provided containers of rigid and sturdy construction to safeguard cargo items being transported or stored therein. However, the side panels of the previous containers have been attached to the container frame most often using a bolt that passed through the panel. This made the use of a polycarbonate panel undesirable because of stress crazing and cracking that occurred around the bolt holes through which the bolt passed when attaching the panel. Additionally, the attempted use of nuts and bolts, rivets, fixings or the like to attach the side panel necessitated much effort to replace any side panel, in that removing the panel required disassembly of the nut and bolt combination. Special tools were often needed and the individual nuts and bolts were lost, especially under operating conditions for loading cargo containers into airplanes, i.e., urgency and sometimes poor illumination. Additionally, the commonly used panel material, aluminum, is not transparent. Thus the cargo handlers cannot see how or to what extent the cargo container is loaded. The lack of transparency of prior panels also hid undesired acts of pilferage from plain view.

A container constructed in accordance with the present invention provides long sought solutions to the above problems with a maximum of strength and a minimum of weight. By eliminating any need to pass a bolt through the polycarbonate panel, stress crazing of the panel has been eliminated. The interaction of the inventive corner molding joint with the herein disclosed method for shape-forming the edges of a polycarbonate plastic panel allow the use of polycarbonate panels in air cargo containers. The resulting corner molding joint also has the advantage of allowing quick and easy replacement of damaged side panels through the use of preferably an integral jack-bolt mechanism for engaging and disengaging strongly mated and fixed parts of the corner joint. The jack-bolt mechanism coupled with toughness and transparency of the polycarbonate panels also allows easy repair in adverse conditions, requiring no more than a power screwdriver. Furthermore, the new and improved assembly prevents the loss of any parts needed to reassemble the air cargo container when a damaged panel needs replacement.

OBJECTS AND SUMMARY OF THE INVENTION

An object of the present invention is to disclose a container using an interlocking corner joint that is of great strength, usually repairable in the field using the minimum of labor, tools or specialized training, and is capable of receiving a transparent polycarbonate plastic panel formed by a herein disclosed method for shape-forming the edges of the panel.

Another object of the invention is to disclose a method for shape-forming the edges of a polycarbonate plastic panel into matching corrugations such that it internests with corrugations of the disclosed corner joint edges.

In an exemplary embodiment of the invention a method for manufacturing a cargo container is disclosed wherein the edges of a transparent polycarbonate panel is shape-formed into at least one corrugation by passing the panel edge preheated to about 55° C. (120° F.) through one or more roller dies disposed so as to progressively shape-form corrugations into panel edges; then introducing the panel between an outer and inner corner molding strip adapted to mate lengthwise to form peripheral edges of a container; then tightening threaded bolts inserted through aligned holes in the inner and outer corner molding strips, but not penetrating said panel, the bolt mated with a nut, the nut retained by non-rotatable means, the tightening effecting a press fitting and releasable retaining of said panel by the molding strips; and finally attaching a door over an opening left without a side panel between peripheral edges of the container.

In yet another embodiment of the invention a method is provided for shape forming the edges of a sheet of polycarbonate plastic into corrugations with substantial parts of the corrugation edges parallel to one another, the sheet with corrugations for internesting with two matching corrugations, each matching corrugation forming the edges of one of two pieces of an interlocking corner joint of a cargo container, the method comprising: heating the edge of the sheet to at least an incrementally formable temperature of approximately 55° C. (120° F.) plus or minus approximately 10 degrees; and then passing the edge of the sheet through a series of roller dies that progressively form the plastic into the desired corrugations.

BRIEF DESCRIPTION OF THE DRAWINGS

Figure 1:
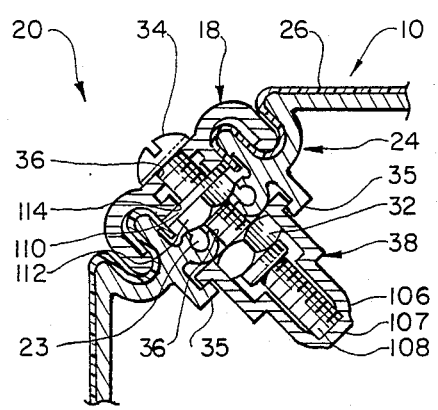

Having thus described the invention in general terms, reference will now be made to the accompanying drawings in which:

FIG. 1 is an enlarged cross-sectional view of the corner of an air cargo container.

Figure 2:
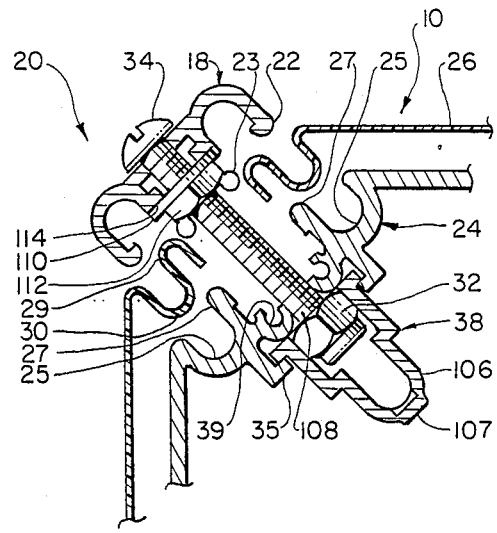

FIG. 2 is the same corner joint of the air cargo container shown in a disengagement mode.

Figure 3:
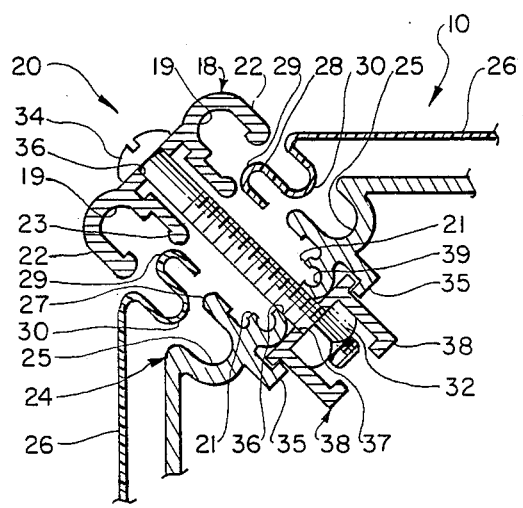

FIG. 3 is the same corner joint as shown in FIG. 1 with the upper nut removed to better illustrate details of the invention.

Figure 4:
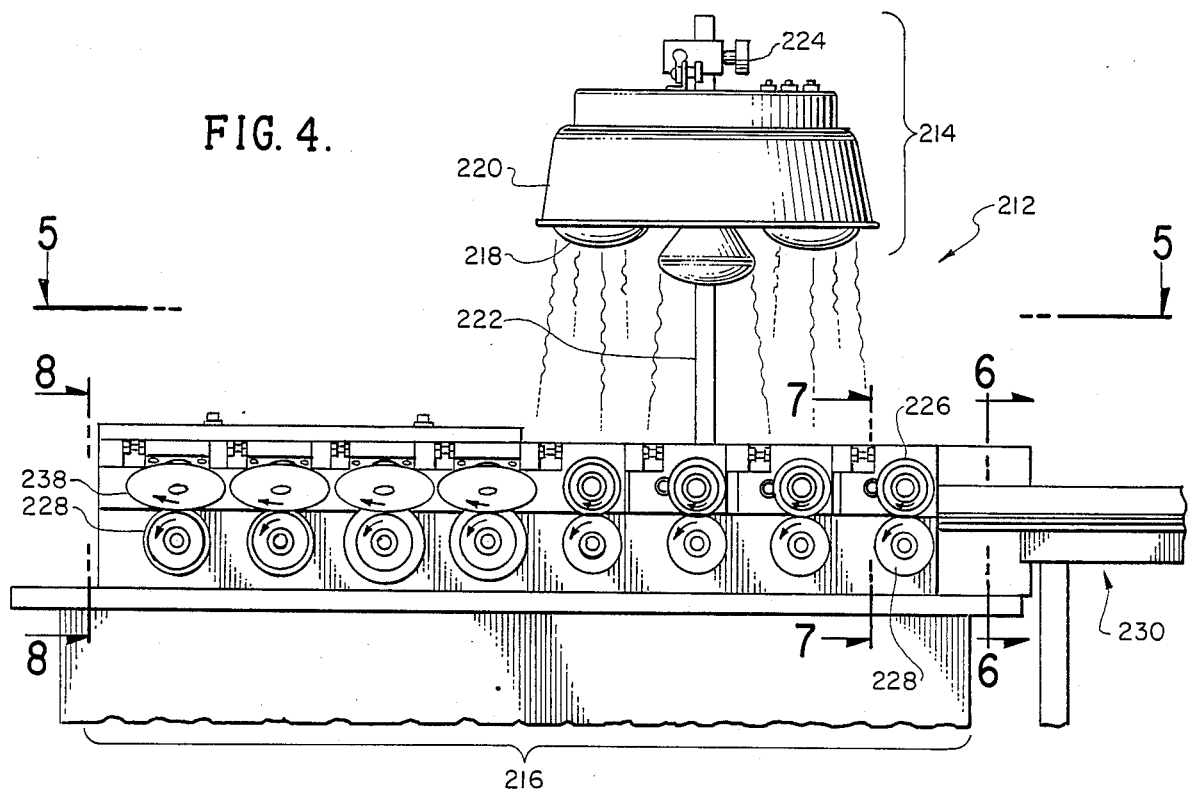

FIG. 4 is a horizontal elevation of the shaping apparatus.

Figure 5:
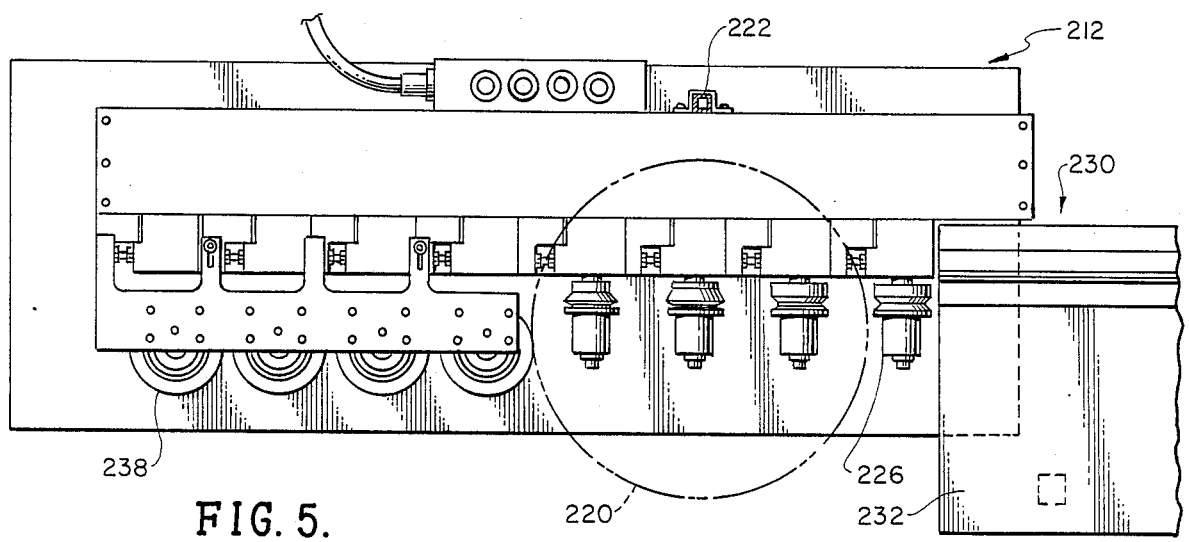

FIG. 5 is a partially cut away vertical elevation of the apparatus.

Figure 6:
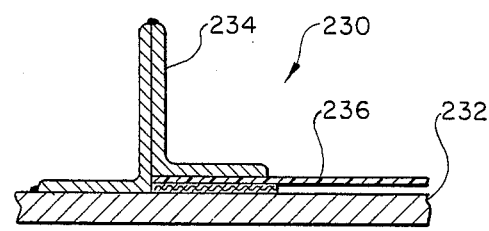

FIG. 6 is a partial horizontal cross-section of the shaping apparatus taken along line 6—6 shown in FIG. 4.

Figure 7:
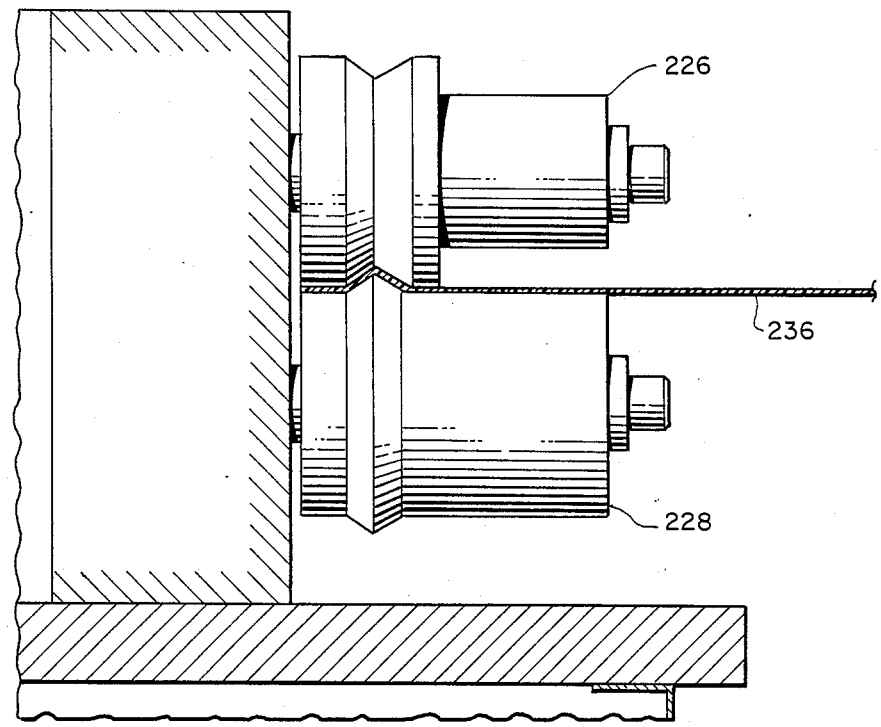

FIG. 7 is a partial horizontal cross-section of the shaping apparatus taken along line 7—7 in FIG. 4.

Figure 8:
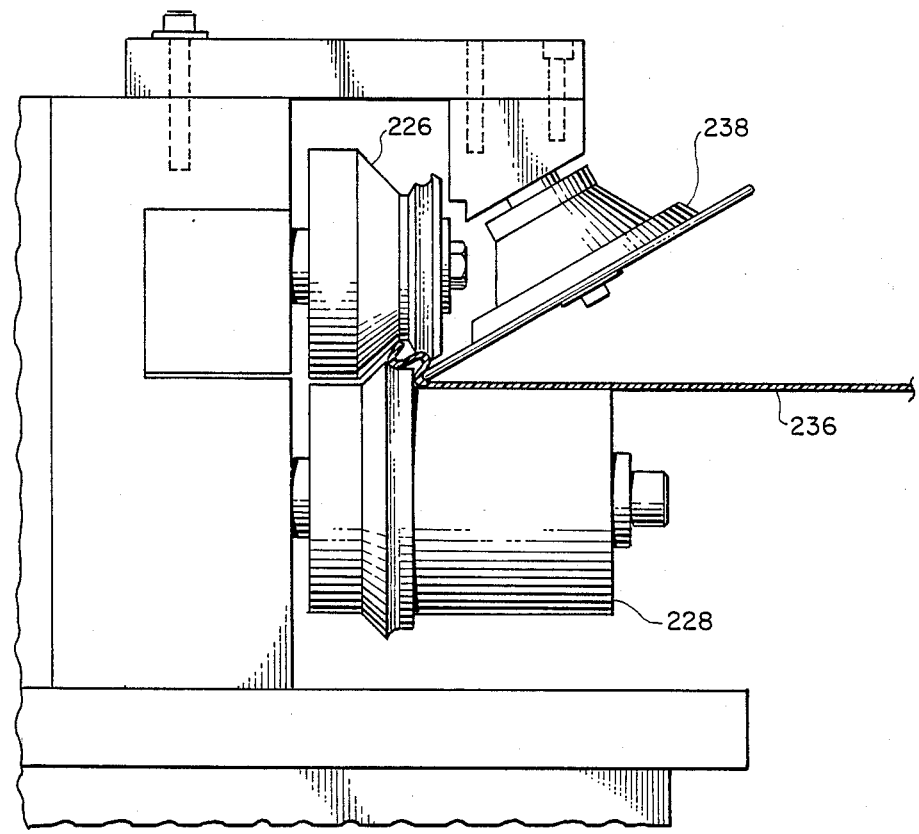

FIG. 8 is a partial horizontal cross-section of the shaping apparatus taken along line 8—8 in FIG. 4.

DETAILED DESCRIPTION OF THE PREFERRED EMBODIMENT

Referring to the drawings, where like numbers of reference indicate like elements throughout, it will be noted that the preferred embodiment of this invention for use as an air cargo container is the same corner joint as disclosed in commonly invented and commonly owned U.S. patent application Ser. No. 06/902,668, which is specifically incorporated herein by reference. In FIG. 3, peripheral corner 20 of container 10 is constructed with an outer corner panel strip 18 having flanged edges 22 adapted to mate lengthwise with an inner corner molding strip 24 and retaining side panel skins 26 thereinbetween to form the peripheral corner 20 of container 10.

An outer panel skin 26 forms a side of container 10. Peripheral edges 28 of outer panel skin 26 are adapted to be inserted and releasably retained between outer channel strip 18 and inner molding strip 24.

The corrugated configuration of the peripheral edges 28 of the outer panel skin 26 is formed by rolling parallel ridges 29 and 30 around the four edges of each panel. The ridges are retained within corresponding longitudinal grooves 25 and 19, in the inner and outer molding strips 24 and 18, respectively. A projecting lip 27 of the inner molding strip 24 mates with ridge 29 and forces it into a groove 19 of the outer channel strip 18. Simultaneously, the flanged edges 22 of the outer channel strip 18 mate with the ridge 30 of the two side panel skins 26 and force them into opposite grooves 25 of the inner corner molding 24. Projecting lips 23 on the underside of the outer channel 18 mate with preferably semicircular grooves 39 on the inner molding 24 and give the joint integral strength when the two moldings are clamped together. Thus, when threadably tightened, a bolt and nut combination 34 and 32 will compress and retain in a releasable lengthwise relation, the corrugated peripheral edges 28 of the outer panel skins 26 inserted between the inner and outer corner molding strips 24 and 18 to form the structural corner 20 of the container 10.

The bolt 34 is inserted through aligned holes 36 in the inner and outer corner molding strips 24 and 18 and hole 37 in a short channel piece 38. The nut 32 is held rotationally immobile in the channel 38 which is slidably inserted in the inner corner molding strip 24 and therein held in place by channel-like extensions 35 protruding from the inner side of molding strip 24. The nut holding channel 38 is therein retained by inwardly protruding lips.

Thus, as best shown in FIG. 2, in the replacement of damaged outer panel skins 26, the component parts comprising the structural corner 20 are not totally dismantled and the bolts and nuts 34 and 32 remain engaged in the channel molding strip 18 and inner molding strip 24, thus preventing their separation and loss.

The configuration of channel 38 shown in FIG. 3 is modified by the addition of an integrally formed U-shaped extrusion 106, as shown in FIGS. 1 and 2. In this embodiment, the projecting end 108 of the bolt 34, when tightened in nut 32, is protectively encapsulated by channel 38 with its U-shaped extrusion 106, thus preventing damage to the extended end of bolt 34 or the thread thereon and also the cargo stored within the container. When the bolt 34 is tightened during the assembly of the peripheral corner 20 of the container 10, its length is such as to cause a dimple 107 in the U-shaped portion 106 of the channel 38. Thus, the mating of the bolt end 108 and dimple 107 prevents the channel 38 from sliding from its position encompassing the nut 32, especially on the vertical corners. When the bolt 34 is rotatably retracted to the position shown in FIG. 2, its end 108 remains threadably engaged with the nut 32. This retracted position permits the disengagement of the outer skin 26 which was retained between the outer molding strip 18 and the inner molding strip 24. Thus, the component parts comprising the peripheral corner 20 are not totally dismantled during the attachment and/or replacement of the outer skin panel 26.

In the second preferred embodiment as shown in FIGS. 1 and 2, it should be noted that a washer 110 and supporting nut 112 are threadably mounted on bolt 34 in a counterbored recess 114 in the underside of the molding strip 18. The self-locking nut 112, commercially known as a "nyloc-nut", has a nylon insert which clinches the nut onto the threads of the bolt 34 in a relative position allowing a clearance space between the washer 110 and molding strip 18, thus permitting the bolt to rotate in the hole 36 and in the outer molding strip 18. Thus, when the bolt 34 is rotatably retracted to its outer position as shown in FIG. 2, the washer 110 and nut 112 rotate with the bolt and remain in their relative position affixed upon the bolt 34. The nut 32 being held rotationally immobile in the channel 38 unscrews from the bolt 34, thus forcing the outer molding strip 18 to disengage from its locking position with inner molding 24 and, thereby, releasing outer skin 26.

Referring now to FIG. 4, which is a horizontal elevation of apparatus 212, the apparatus 212 can be composed of two sections, the heating means 214 and shaping means 216. The heating means 214 is composed of one or more heating lamps 218 enclosed as in a shroud 220. This shroud 220 can be mounted on a pole 222 by clamp 224. Clamp 224 can be loosened and the heating means 214 adjusted up and down. This allows the distance between the heating means 214 and the shaping means 216 to be varied.

The lamps 218 can be such as infra-red heat lamps. Typically, these heating lamps draw 250 watts of electric current. For example, a collection of 7 heating lamps, can raise the temperature of a metal part up to around 110° F. (49° C.) approximately when positioned 14 inches away.

The shaping means 216 is composed of a series of opposed roller dies 226 and 228, wherein roller die 226 is disposed on top of roller die 228. Although FIG. 4 shows eight such pairs of roller dies 226 and 228, the number of opposed roller die pairs can be varied depending upon the geometry desired in the final edge of the plastic sheet to be shape-formed. The roller dies 226 and 228 move in the same direction but in opposite rotation. Positioning means 230, shown in FIG. 6, allows the sheets to be introduced into the series of opposed roller dies. The roller dies 226 and 228 are powered by electric motors.

FIG. 5 is a vertical elevation of apparatus 212. Heating shroud 220 is shown in phantom to show its position in relation to the top roller die 226. Alternatively, the heating assembly could be configured to heat all the top roller dies or even all the roller dies, bottom and top. Also seen is positioning means 230 which is composed of a horizontal table 232 with a guide 234 composed of angle iron mounted above the table 232. The angle iron of guide 234 is mounted sufficiently far above the table 232 to allow a sheet of plastic material to slide along felt webbing placed on top of the table 232. The positioning means 230 guides the sheets of thermoplastic material into the series of opposed roller dies 226 and 228.

FIG. 7, which is a partial horizontal cross-section of the apparatus 212, shows a sheet 236 of thermoplastic material going through the first pair of roller dies 226 and 228. The roller dies are deforming the thermoplastic material sheet 236 as shown.

FIG. 8, which is a partial horizontal cross-section taken along lines 8—8 in FIG. 4, shows the thermoplastic material sheet 236 as it emerges from the last set of roller dies 226 and 228. Also impinging upon the thermoplastic sheet 236 is a third roller die 238. As can be seen, the set of three roller dies 226, 228 and 238 are beyond the range of heating means 214. However, due to the pre-heating of the panel and the heating of the first series of roller dies, the thermoplastic material is still amenable to shaping. Also illustrated in FIG. 8 is the complex shape with the minimal radius of curvature for the ridges formed in the edge of sheet 236.

The apparatus and method of the present invention maintains enough heat in the edge of the sheet 236 of plastic material so that the edge may be shaped into the desired geometry by the series of roller dies 226, 228 and, if needed, 238. The heat is transferred into the sheet 236 by first heating the panel separately to 120° F. before putting the sheet into the apparatus. The top roller die 226 is heated, in turn, by the heating means 214. The heat transfer from the roller die 226 to the sheet 236 is accomplished by direct contact and is to maintain the sheet temperature near 120° F. The heat transfer from the heating means 214 to the top roller die 226 is accomplished by radiation heating where heat lamps 218 are used. In the case of infra-red heat lamps, in an assembly of 7 heat lamps together, the temperature of the top roller die 226 reaches 110° F. (49° C.). This is sufficient to maintain enough heat in the plastic sheet 236 to make it amenable to shaping by the roller die 226 and 228. Thus, the sheet 236 is pliable enough to be reshaped into the desired geometry.

One specific use of the apparatus and method for shaping the edges of thermoplastic material sheets is in manufacture of advanced air cargo containers. It is desirable that the side panels of air cargo containers be light, yet strong enough to withstand rough handling and other abuses. Polycarbonate material, such as polycarbonate produced by General Electric Company, meets this requirement. In one specific type of air cargo container, the geometry required for the edges of the side panel skins consists of a series of corrugations. The radius of curvature is typically the thickness of the sheet material. In the case of polycarbonate, cold forming techniques are not recommended where the radius of curvature is less than 100 times the thickness of the sheet material. If the radius of curvature is less, stress crazing can result.

In particular, it has been found that a collection of infra-red heat lamps, positioned in a shroud assembly about 14 inches from the top roller die, was sufficient to raise the temperature of the top roller die to 110° F. (49° C). In particular, when a sheet of 1/16th inch thick of polycarbonate is introduced into the shaping means containing the roller dies, above which the heating assembly described hereinbefore is mounted 14 inches away from the initial top roller dies, the complicated geometry required for side panels of air cargo containers can be shaped-formed into the edges of the sheet.

A most important feature of this invention is the joint as used with the particular polycarbonite material. The joint is a continuous joint so that every piece of the joint is providing strength. When there is a riveted or bolted or any mechanical joint, the strength is provided by the rivet, and if the rivets are at half-inch, one inch, two inch, or whatever pitch that they are, the strength is only provided at those points and pitches. If high strength is desired, a very high number of fixings, rivets, bolts, or whatever have to be employed. For the present container with the polycarbonate panel, tests have shown that loads of 500 lbs. per inch were obtained. The area of the joint or the linear length of the joint on top of the present container is 160 inches plus 120 inches which gives approximately 280 inches and, at 500 lbs. per inch, it gives the staggering load of approximately 150,000 lbs. Without use of the herein described joint, it would need probably a table line of rivets every half inch to approach the load which is obtained from this joint. The cost of doing that would be prohibitive. The added weight would be prohibitive. The maintenance costs would be prohibitive. With the present design, one man with a power screwdriver can remove or replace a panel in five minutes. Thus, a massively high level of strength equal to the tensile strength of these polycarbonate sheets is achieved, coupled with ease of assembly and disassembly are achieved.

Another feature of this design is that the joint creates its own hollow section which provides greater stiffness of the frame. In either of these materials, aluminum or polycarbonate, the container structure produces a diaphragm effect as with drums where the skin of the drum is in tension against a strong outside periphery. There is still flexibility so that, when it receives a blow, it absorbs a tremendous amount of energy before breaking. The strong frame is achieved by way of the extrusions (inner and outer corner molding strips) which are made stronger because the clamping extrusion forms a hollow section as two independent clamping extrusions come together to form a hollow extrusion, which means that the stiffness of the frame is very much greater than it would otherwise be.

The joint that has been disclosed herein enables polycarbonate panels to be used. Polycarbonate has been around for many years, but it has never been able to be used in this application, because the only way of fixing it to any box is by way of fixing it by rivets, or whatever, which would inevitably fail due to stress corrosion. As noted, there are no holes in the instant design; therefore, the disclosed joints make polycarbonate useable and it cannot be used without this type of joint. Referring to FIG. 3, the important factors are the two inner legs of the capping extrusion which have small beads 23. The small beads fit into the recesses marked 39 on the structural extrusion by driving past rims 21 which go back to the position shown in FIG. 3 once the beads have passed by. When these two beads are connected and home, the two extrusions become one integral extrusion. The force required to make them and to disengage them is very, very significant.

The jackbolt, which is item 108 (FIG. 1 & 2), is the means of forceably removing the capping extrusion (inner corner molding strip) from the structural extrusion (outer corner molding strip). When these two legs 23 are connected to the structural extrusion, the capping is fixed and the fixing joint, which is shown on the panel, is sufficient to prevent the panel from coming out. It should be noted that the grooves are deep. It therefore means that if the snap-fit is to pull out, the leg 23 must bend. And when the leg bends, it comes into the side and the more it comes into the side the more it jams. The same effect is experienced on the inside area about the number 39. So this becomes absolutely fixed because the two legs are fixed in the center at 23, 39.

The bolts 34 themselves are not necessary from a structural point of view. The bolts enable the capping to be put on and taken off. It therefore, in effect, produces a joint which requires no bolt for the purpose of the joint Now what happens is after pressure is put on by the bolt, those two middle legs 23 bend inwards and as they get past the cam-like detent, they spring back (as little as 0.020"), which makes a firm snap and a permanent connection between the capping and structural extrusions until forced apart, as noted by the jackbolt 108 (FIG. 2).

The outside capping leg fits into a U-section. The gap in that U-section is designed to be no more than 1/16th of an inch. The polycarbonate panel is 1/16th of an inch throughout (including its formed edges). The more load that goes on the panel the more it tends to try to pull that leg upwards, which causes it to cram or jam into the side of the panel and into the adjacent leg of the structural extrusion. The panel is jammed between the two extrusions, i.e., a load being put on the panel is going to try to pull the leg outwards and the more it tries to pull it outward the more it crams into the structured extrusion, jamming the panel between the structured extrusion and the capping extrusion. That action tightens it. The more load that goes on, the tighter it gets—importantly and uniformly all along the extrusions.

If just the bolts were holding the part in position, say at three foot spacing, and a very severe load is put in the middle of the three foot spacing, there would be a tendency then for the capping extrusion to bend and bow outwardly between the bolts, which would tend not to allow the frame to work as it has been designed. Instead of coming up into and against the structured extrusion, it would tend to lift and pull out.

Because it has a second outer leg, that second leg 18 goes into the structured extrusion and jams into the structured extrusion—which makes it impossible for that to happen. Once the extrusion is locked it can't come out. The panel is stuck between the extrusions when, effectively, two have become one homogeneous whole—a perfect joint around and clamping uninterruptedly the thus formed edges of the polycarbonate diaphragm. When those two legs in the middle engage, it becomes homogenous—two are made into one. The two extrusions have the same structural value as one extrusion.

The invention described above is susceptible to many variations, modifications and changes, all of which are within the skill of the art. It should be understood that all such variations, modifications and changes are within the spirit and scope of the invention and the appended claims. Similarly, it will be understood that it is intended to cover all changes, modifications and variations of the example of the invention herein disclosed for the purpose of illustration which do not constitute departures from the spirit and scope of the invention.

I claim:

1. A method for manufacturing a cargo container comprising:

shape forming the edges of a transparent polycarbonate panel into at least one corrugation by passing said panel edge preheated to about 55° C. (120° F.) through one or more roller dies disposed so as to progressively shape-form corrugations into a panel edge;

introducing said panel between an outer and inner corner molding strips adapted to mate lengthwise to form peripheral edges of said container;

tightening threaded bolts inserted through aligned holes in the inner and outer corner molding strips, but not penetrating said panel, said bolt mated with a nut, said nut retained by non-rotatable means, said tightening effecting a press fitting and releasable retaining of said panel by said inner and outer corner molding strips; and attaching a door over an opening left without a side panel between peripheral edges of the container.

2. The method of claim 1 wherein said polycarbonate panel is semi-transparent.

3. The method of claim 2 wherein said nut retaining means is a generally U-shaped inner channel strip mating lengthwise with the inner corner molding strip, the depth of said U-shaped inner channel being substantially the same as the threaded bolt so that when the threaded bolt is fully tightened, the end of the bolt engages against the bottom wall of the U-shaped inner channel strip.

4. The method of claim 1 wherein said threaded bolt and nut combination biases inner and outer corner molding strips apart when said bolt is loosened.

5. The method of claim 1 wherein said roller dies are heated by a radiant heating means spaced apart from said roller dies.

6. The method of claim 4 wherein said radiant heating means comprises at least one heat lamp means.

7. The method of claim 6 wherein said radiant heating means comprises two sets of heat lamps wherein both sets are on when said roller dies are being heated to an operating temperature, but only one set is on after said roller dies reach operating temperature.

8. The method of claim 1 wherein said roller dies are at a temperature of approximately 49° C. (110° F.) during said shape forming.

9. The method of claim 1 wherein said nut retaining means is a generally U-shaped inner channel strip mating lengthwise with the inner corner molding strip, the depth of said U-shaped inner channel being less than the length of the threaded bolt so that when the threaded bolt is fully tightened, said threaded bolt pushes into the bottom wall of the U-shaped inner channel strip.

10. The method of claim 1 wherein said corrugation at the edges of said panel comprise at least one rolled ridge adapted to be inserted and releasably retained between at least one combination of a projecting lip and groove, said combination being formed by the mating of said outer corner molding strip and said inner corner molding strip.

11. The method of claim 10 wherein said panel has a first rolled ridge oriented to open away from the container, and a second rolled ridge oriented to open toward the container, said second rolled ridge being between the edge of said panel and first rolled ridge, said first rolled ridge inserted and releasably retained in a first combination of a projecting lip in said outer corner molding strip and a groove in said inner corner molding strip, and said second rolled ridge inserted and releasably retained in a second combination of the projecting lip in said inner corner molding strip and a groove in said outer corner molding strip.

12. The method of claim 11 wherein said molding strip further comprises:

a secondary projecting lip outside of said panel when said panel is inserted between said inner and outer corner molding strips;

said secondary projecting lip ending in a projecting lip means interfitting with semicircular secondary groove means disposed on opposing molding strips for giving the joint integral strength when the two opposing molding strips are press fitted together.

13. The method of claim 1 wherein said cargo container can withstand a load of approximately 500 pounds per inch on the press-fitted together molding strips.

14. The cargo container produced by the method of:

shape-forming the edges of a transparent polycarbonate panel into at least one corrugation by passing said panel edge preheated to about 55° C. (120° F.) through one or more roller dies disposed so as to progressively shape form corrugations into a panel edge;

introducing said panel between an outer and inner corner molding strips adapted to mate lengthwise to form peripheral edges of said container;

tightening threaded bolts inserted through aligned holes in the inner and outer corner molding strips, but not penetrating said panel, said bolt mated with a nut, said nut retained by non-rotatable means, said tightening effecting a press-fitting and releasable retaining of said panel by said inner and outer corner molding strips; and attaching a door over an opening left without a side panel between peripheral edges of container.

15. A confined storage space for cargo produced by the steps of:

shape forming the edges of a transparent polycarbonate panel into at least one corrugation by passing said panel edge preheated to about 55° C. (120° F.) through one or more roller dies disposed so as to progressively shape-form corrugations into a panel edge;

introducing said panel between outer and inner corner molding strips adapted to mate lengthwise to form peripheral edges of said container;

tightening threaded bolts inserted through aligned holes in the inner and outer corner molding strips, but not penetrating said panel, said bolt mated with a nut, said nut retained by non-rotatable means, said tightening effecting a press-fitting and releasable retaining of said panel by said inner and outer corner molding strips; and attaching a door over an opening left without a side panel between peripheral edges of container.

16. A method for shape forming the edges of a sheet of polycarbonate plastic into corrugations with substantial parts of the corrugation edges parallel to one another, said sheet with corrugations for internesting with two matching corrugations, each matching corrugation forming the edges of one of two pieces of an interlocking corner joint of a cargo container, said method comprising:

heating the edge of said sheet to at least an incrementally formable temperature of approximately 55° C. (120° F.), plus or minus approximately 10 degrees;

passing the edge of said sheet through a series of roller dies, at least one of said roller dies being heated to maintain temperature of the edge of the heated sheet, that progressively form the plastic into the desired corrugations.

17. The method of claim 16 wherein said heated roller dies are heated to a temperature of 49° C. (110° F.).

* * * * *